(12) United States Patent
Benkert et al.

(10) Patent No.: US 11,760,068 B2
(45) Date of Patent: Sep. 19, 2023

(54) CERAMIC INSULATOR

(71) Applicant: Siemens Energy Global GmbH & Co. KG, Munich (DE)

(72) Inventors: Katrin Benkert, Schwaig (DE); Werner Hartmann, Weisendorf (DE); Martin Koletzko, Erlangen (DE); Sylvio Kosse, Erlangen (DE); Steffen Lang, Hallerndorf (DE); Thomas Rettenmaier, Erlangen (DE); Norbert Wenzel, Erlangen (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 747 days.

(21) Appl. No.: 16/301,844

(22) PCT Filed: Apr. 7, 2017

(86) PCT No.: PCT/EP2017/058352
§ 371 (c)(1),
(2) Date: Nov. 15, 2018

(87) PCT Pub. No.: WO2017/198391
PCT Pub. Date: Nov. 23, 2017

(65) Prior Publication Data
US 2019/0168489 A1 Jun. 6, 2019

(30) Foreign Application Priority Data

May 19, 2016 (DE) .................... 10 2016 208 572.7
Aug. 9, 2016 (DE) .................... 10 2016 214 750.1

(51) Int. Cl.
*B32B 18/00* (2006.01)
*H01B 19/00* (2006.01)
(Continued)

(52) U.S. Cl.
CPC ............. *B32B 18/00* (2013.01); *C04B 37/00* (2013.01); *H01B 3/12* (2013.01); *H01B 19/00* (2013.01);
(Continued)

(58) Field of Classification Search
None
See application file for complete search history.

(56) References Cited

U.S. PATENT DOCUMENTS 8,445,804 B2  5/2013  Schellekens et al. ........ 218/139
2003/0141282 A1* 7/2003  Renz ................ H01H 33/66261
                                                    218/118
(Continued)

FOREIGN PATENT DOCUMENTS

CN        1357901 A     7/2002   ............. H01H 33/78
CN       202178506 U    3/2012   ............. H01B 17/58
(Continued)

OTHER PUBLICATIONS

Japanese Office Action, Application No. 2018560510, 9 pages, dated Jan. 21, 2020.
(Continued)

*Primary Examiner* — Mohammad M Ameen
(74) *Attorney, Agent, or Firm* — Slayden Grubert Beard PLLC

(57) ABSTRACT

Various embodiments include a method for producing a ceramic insulator for a high-voltage or medium-voltage switching system comprising: attaching a base material for an equipotential layer between two axially symmetrical ceramic structural elements; disposing the electrically conductive equipotential layer between the two ceramic structural elements; and joining the two ceramic structural elements to form a unitary body along a symmetry axis of a first of the two elements.

7 Claims, 3 Drawing Sheets

(51) Int. Cl.
  *H01B 3/12* (2006.01)
  *C04B 37/00* (2006.01)
  *H01H 33/66* (2006.01)

(52) U.S. Cl.
  CPC ......... *H01H 33/66* (2013.01); *C04B 2237/12* (2013.01)

(56) References Cited

U.S. PATENT DOCUMENTS

| | | | |
|---|---|---|---|
| 2011/0286145 A1* | 11/2011 | Langens | H01B 17/28 361/302 |
| 2016/0104590 A1 | 4/2016 | Campbell et al. | 218/136 |
| 2019/0168489 A1 | 6/2019 | Benkert et al. | |

FOREIGN PATENT DOCUMENTS

| | | | | |
|---|---|---|---|---|
| CN | 104124652 A | 10/2014 | | H02G 5/04 |
| CN | 104299838 A | 1/2015 | | H01H 33/66 |
| DE | 199 46 343 A1 | 4/2001 | | B32B 18/00 |
| DE | 19946343 A1 * | 4/2001 | | |
| DE | 102009007583 A1 | 8/2010 | | H01B 17/28 |
| DE | 10 2012 214 055 A1 * | 2/2013 | | |
| DE | 10 2012 214 055 A1 | 2/2014 | | H01B 17/64 |
| DE | 102012214055 A1 * | 2/2014 | | |
| GB | 609030 A | 9/1948 | | |
| JP | 62138370 A | 6/1987 | | C04B 37/00 |
| JP | 03254030 A | 11/1991 | | H01H 33/66 |
| JP | 2000114355 A | 4/2000 | | C04B 37/00 |
| JP | 2004503904 A | 2/2004 | | H01H 33/66 |
| JP | 2014026854 A | 2/2014 | | H01H 33/662 |
| RU | 2566426 C2 | 10/2015 | | B05D 3/00 |
| WO | 2017/198391 A1 | 11/2017 | | B32B 18/00 |

OTHER PUBLICATIONS

International Search Report and Written Opinion, Application No. PCT/EP2017/058352, 16 pages, dated Jul. 14, 2017.
Chinese Office Action, Application No. 201780030836.8, 6 pages, dated Nov. 27, 2020.
European Office Action, Application No. 17719816.5, 4 pages, dated Dec. 10, 2020.
Russian Office Action, Application No. 2018142040, 9 pages, dated Jun. 27, 2019.

* cited by examiner

CERAMIC INSULATOR

CROSS-REFERENCE TO RELATED APPLICATIONS

This application is a U.S. National Stage Application of International Application No. PCT/EP2017/058352 filed Apr. 7, 2017, which designates the United States of America, and claims priority to DE Application No. 10 2016 208 572.7 filed May 19, 2016 and DE Application No. 10 2016 214 750.1 filed Aug. 9, 2016, the contents of which are hereby incorporated by reference in their entirety.

TECHNICAL FIELD

The present disclosure relates to ceramic insulators. Various embodiments may include a method for producing a ceramic insulator.

BACKGROUND

The insulating capability of solids such as, for example, aluminum oxide ceramics, in relation to high-voltage loads is generally very high, but is limited by the finite electric strength of solids. This also applies to high-voltage insulators, in particular ceramic insulators for medium-voltage and high-voltage vacuum interrupters. The reason therefore is the buildup of discharge within insulators, which is conjointly determined by the defect density in the direction of the field. The dielectric strength, the breakdown field strength, in the solid herein does not scale directly with the insulator length but is proportional to the square root of the insulator length.

It becomes increasingly difficult to attain the required proof voltage of, for example, vacuum interrupters for the high-voltage sector, thus in a range above 72 kV, in particular for high voltages above approximately 100 kV. To date, this problem, in particular in the case of vacuum interrupters in power transmission and distributor engineering, has been solved in that a plurality of comparatively short components are used instead of a single cylindrical insulator component having a relatively large length, said plurality of comparatively short components in the axial direction being connected to one another by a suitable, vacuum-tight and mechanically stable connection technology such as, for example, a brazing solder. The composite of a plurality of such comparatively short insulators according to the physical laws of the internal proof voltage described above has a higher proof voltage than an integral insulator of the same length. However, this solder method overall is very cost intensive since a high technical complexity is required in order for the corresponding vacuum tightness to be generated for the connection.

SUMMARY

The teachings herein may be embodied in a ceramic insulator for a high-voltage or medium-voltage switching system that is producible in a cost-effective manner in technical terms. For example, some embodiments may include a method for producing a ceramic insulator (2) for a high-voltage or medium-voltage switching system (4), wherein at least two axially symmetrical ceramic structural elements (6) are joined in the direction of the symmetry axis (8) of the latter, and an electrically conductive equipotential layer (10) is disposed between the structural elements (6), characterized in that a base material for the equipotential layer (10) is already attached between the ceramic structural elements (6) prior to a sintering process of said ceramic structural elements (6).

In some embodiments, a sintering procedure of the ceramic structural elements (6) and a joining procedure of the structural elements (6) are at least in part performed in the same method step.

In some embodiments, the base material for the equipotential layer (10) is a metal foil, a metal powder, a metallic woven fabric, a conductive ceramic, or an electrically conductive glass-forming material.

In some embodiments, the base material (12) for the equipotential layer (10) is incorporated between two green bodies (14) of the ceramic structural element (6).

In some embodiments, the base material (12) for the equipotential layer (10) is incorporated by dip coating, by a thermal spray coat, by a chemical of physical deposition method, or in the form of a foil.

In some embodiments, the base material (12) for the equipotential layer (10) is incorporated between the ceramic base material (18) of the green bodies (14) during the filling into a press mold (16).

In some embodiments, the ceramic base material (18) and the equipotential layer (10) are filled in an alternating manner into a press mold (16), and said ceramic base material (18) and said equipotential layer (10) are subsequently pressed so as to form a multi-layered green body (20).

In some embodiments, a height (22) of the ceramic structural elements (6) along the symmetry axis (8) of the latter is between 5 mm and 50 mm.

As another example, some embodiments may include a ceramic insulator for a high-voltage or medium-voltage switching system, having at least two axially symmetrical ceramic structural elements (6), wherein the structural elements (6) are connected by an equipotential layer (10), characterized in that the length of the structural elements (6) along the symmetry axis (8) of the latter is between 5 mm and 50 mm.

In some embodiments, the structural element (6) and the equipotential layer (10) have a monolithic connection.

In some embodiments, the structural element (6) and the equipotential layer (10) are interconnected by sintering.

In some embodiments, the length of the structural elements (6) along the symmetry axis (8) thereof is between 10 mm and 35 mm, in particular between 15 mm and 35 mm, or particularly preferably 15 mm and 25 mm.

BRIEF DESCRIPTION OF THE DRAWINGS

Further embodiments and further features of the teachings herein are explained in more detail by means of the following examples. These herein are exemplary embodiments which do not represent any limitation of the scope of protection. The same features herein are provided with the same reference signs in different design embodiments.

In the figures.

DETAILED DESCRIPTION

Figure 1:
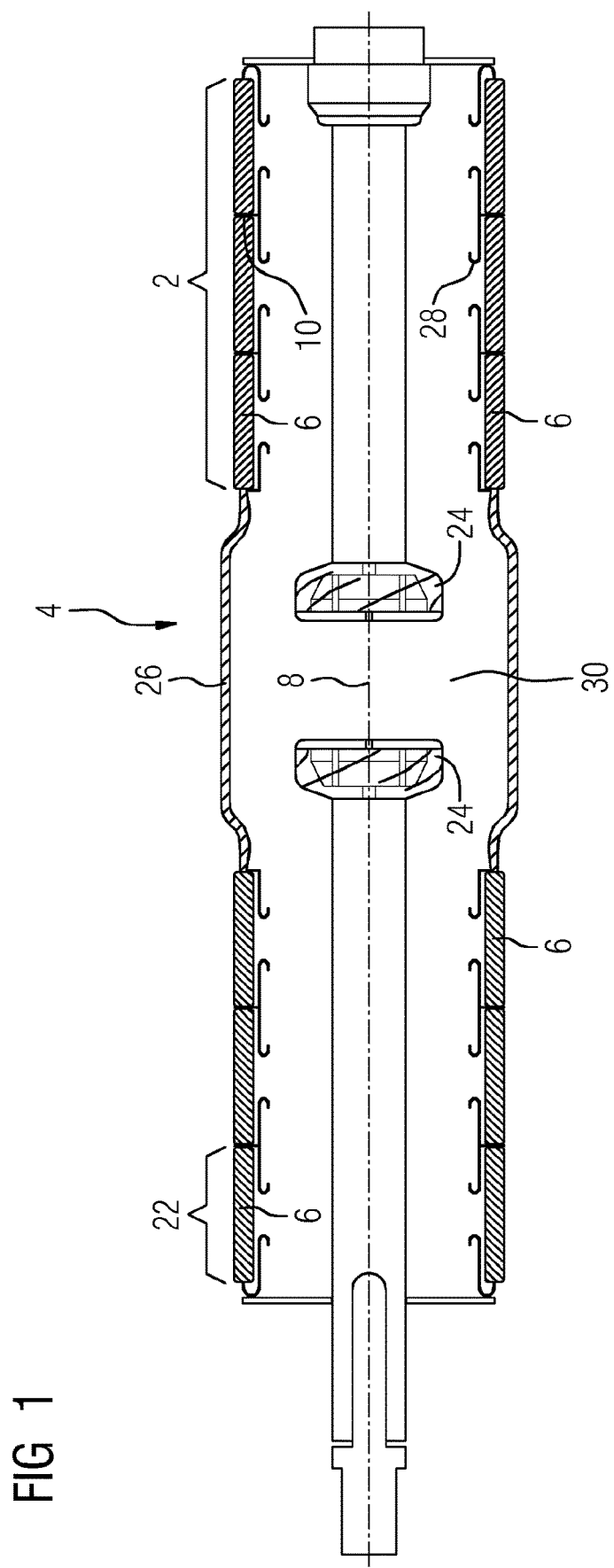
FIG. 1 shows a cross-sectional illustration through a vacuum interrupter having a ceramic insulator incorporating teachings of the present disclosure.

In some embodiments, a method for producing a ceramic insulator for a high-voltage or medium-voltage switching system includes at least two axially symmetrical ceramic structural elements joined along, that is to say in the direction of, the symmetry axis of the latter, that is to say in the direction of the symmetry axis of said structural elements, and an electrically conductive equipotential layer disposed between the structural elements. Along the symmetry axis, or in the direction of the symmetry axis, respectively, herein means that in practice, and in the case of preformed green bodies being used, end faces of said green bodies are joined to one another. Furthermore, the structural elements can also assume shapes which deviate from an axial symmetry, which is why the term symmetry axis in special cases is also understood to be a symmetry face. Elliptic or polygonal bodies are thus also expedient. In some embodiments, the method includes using a base material for the equipotential layer already attached between the ceramic structural elements prior to a sintering process of said ceramic structural elements.

The term structural element herein is understood to be a self-supporting ceramic material which has been created from a so-called green body, wherein a sintering process is applied herein. A ceramic preform in a non-sintered state which can still be readily processed is referred to herein as a green body. A green body is produced, for example, by compressing ceramic powder, optionally mixed with binding agents, by slip casting, or by an extrusion method. In the case of a sintering process, fine-grain ceramic or else metallic substances are heated, optionally at an elevated pressure, wherein the temperatures however remain below the melting point temperature of the main components such that the design or the shape, respectively, of the work piece is largely preserved (taking into consideration the usual so-called sintering shrinkage). Shrinking typically arises herein, wherein the particles of the initial material are compressed and pore spaces are filled.

A differentiation is made between solid-phase sintering and liquid-phase sintering, wherein so-called sintering necks are formed in solid-phase sintering substantially by diffusion processes between the individual particles, said sintering necks leading to a fixed and ultimately monolithic connection. The same process can also be performed with the participation of a liquid phase such that a monolithic connection between the particles of the previous green body is established in this way. Diffusion processes and melting procedures during a sintering process can arise conjointly in parallel in a body, depending on the composition of the phases of the green body. The sintering process takes place as a heat treatment at elevated temperatures, temperatures between 500° and 1500° being usual, this depending very much on the type of the ceramic base material used, or in the case of the sintering of metals on the metallic base material which is sourced for producing the green body, respectively.

Equipotential layers herein are understood to be conducting layers between the ceramic structural elements which have a higher electric conductivity than the ceramic material of the structural elements and which herein are disposed perpendicular in relation to the symmetry axis and which define so-called equipotential faces for axial electric fields. On account thereof, the ceramic is internally subdivided in electrical terms into short axial pieces, on account of which the dielectric strength of the part-distance as well as of the entire insulator is increased. The production of the equipotential layers, in particular with a view to the high requirements set for the vacuum tightness and the electrical insulation, is significantly simplified in terms of production technology by the described method of the direct incorporation of the equipotential layers between the non-fired structural elements prior to a sintering process, this permitting a more cost-effective production of the entire insulator.

In some embodiments, the sintering procedure of the ceramic structural element and herein a joining procedure of the structural elements, with the participation of the material, for the equipotential layer, are at least in part performed in the same method step. The same method step herein is to be understood as meaning that an already pre-joined insulator blank, composed of green bodies of the structural element is subjected to a thermal treatment conjointly with the base material for the equipotential layers disposed between said green bodies. In principle, it is possible that a higher or lower temperature is required for the sintering of the structural elements than for the formation of the equipotential layers. In some embodiments, the overall process can be in two stages or overall in multiple stages, wherein dissimilar atmospheres can also prevail in principle, and a cooling process can take place therebetween. All these successively sequenced part steps during which no mechanical processing of the material is performed, are in this case understood to be the same method step. In some embodiments, a base material for the equipotential layer may be a metal foil, a metal powder, a metallic woven fabric, a conductive ceramic, or an electrically conductive glass-forming material. Mixtures from the substances mentioned can also be used, wherein a suitable material composition is ultimately chosen for the required conductivity which is calculated for the application, such that precisely this conductivity is set in a targeted manner. Besides electrical conductivity of the materials, attention in the selection of the base materials for the equipotential layer is also paid to the sintering behavior or the joining behavior between the equipotential layer and the structural elements, respectively, of said base materials.

In some embodiments, the base material for the equipotential layer is incorporated between two green bodies of the ceramic structural element. In some embodiments, a green body is first produced according to the classic ceramic shape-imparting method described, said green body serving as a preform for the structural element. The base material for the equipotential layer is now incorporated between at least two of said green bodies, wherein the body thus constructed is now fed to the sintering process. In this manner, a connection between the structural elements while forming the equipotential layer is performed directly and simultaneously during the heat treatment process in which the sintering process also takes place. A joining method and a sintering method herein are performed almost simultaneously, e.g. in the same method step, wherein said method step can be performed in multiple stages, as has already been mentioned.

The base material for the equipotential layer herein can be applied by dip coating, by a thermal spray coating method such as, for example, plasma spraying or cold gas spraying, furthermore by a chemical or a physical deposition method such as, for example, so-called chemical vapor deposition. Additionally, the use of a foil, in particular of a metallic foil, or of a metallic sintered body, or of a metallic blank in the form of a green body, respectively, is also possible.

In some embodiments, the base material for the equipotential layer can be incorporated between the ceramic base material of the green bodies during the filling of a press mold, wherein a common joint shape-imparting process is performed in particular by compression. The base material for the structural element and the base material for the equipotential layer are thus compressed so as to form a common multi-layered green body. This green body is subsequently also fed to a heat treatment method which includes a joining process on the one hand and a sintering process on the other hand, wherein physical phenomena, for example in the form of diffusions and fusion bonds, that are similar to those in a sintering process can arise.

Some embodiments may include a ceramic insulator for a high-voltage or medium-voltage switching system, having at least two axially symmetrical ceramic structural elements, wherein the structural elements are connected by an equipotential layer. In some embodiments, the length of the structural elements along the symmetry axis of the latter is between 15 and 35 mm. By virtue of a square-root-shaped profile of the correlation between an electric strength of the ceramic insulator material and the length of the ceramic structural element, no significant increase in the electric strength can be achieved by significantly increasing the length of the individual structural element. A higher electric strength, or an electric strength which is at least identical, can be achieved with a shorter construction mode of the insulator by significantly shortening the structural elements and the corresponding incorporation of conducting equipotential layers between structural elements while using a plurality of structural elements which also require a plurality of joining layers, thus equipotential layers. In some embodiments, an insulator which causes a high degree of shortening in relation to a conventional insulator having structural elements of a length of approx. 80 mm can be constructed when using structural elements which a length between 15 mm and 35 mm, in particular between 20 mm and 30 mm. An optimum between shortening and the application of technically more complex and more cost-intensive equipotential layers is achieved herein.

In some embodiments, a monolithic connection is present between the structural elements and the at least one equipotential layer, said monolithic connection being created, for example, in the case of a common heat treatment step for sintering the structural elements and for joining the latter by way of the equipotential layer by sintering processes between the individual particles of the base material for the equipotential layer and the particles for the ceramic base material of the structural element. The monolithic connection may be a sintered connection.

A switching system 4 is illustrated in FIG. 1, said switching system 4 having a ceramic insulator 2, wherein the ceramic insulator 2 comprises two or a plurality of ceramic structural elements 6 which are mutually separated by equipotential layers 10. Said equipotential layers 10 can be solder layers or metallic rings which are soldered between the structural elements 6. Said equipotential layers 10 or metallic connection layers in many cases also have shield plates 28 which shield the ceramic surfaces of the structural elements 6 against electric field lines and accordingly direct the latter to the equipotential layers. The structural elements 6, or the ceramic insulator 2, respectively, are/is constructed so as to be axially symmetrical along a symmetry axis 8, wherein said structural elements 6 herein are typically illustrated so as to be rotationally symmetrical. In some embodiments, the entire switching system is rotationally symmetrical having dissimilar cross-sectional radii. The ceramic insulator 2 herein is a component part of the overall housing 26 of the switching system 4. Switching contacts 24 which are designed to move along the symmetry axis 8 are disposed in a vacuum switching chamber 30 in the switching system 4, said switching contacts 24 by moving being able to establish or sever, respectively, an electrical contact in the switching system 4.

Figure 2:
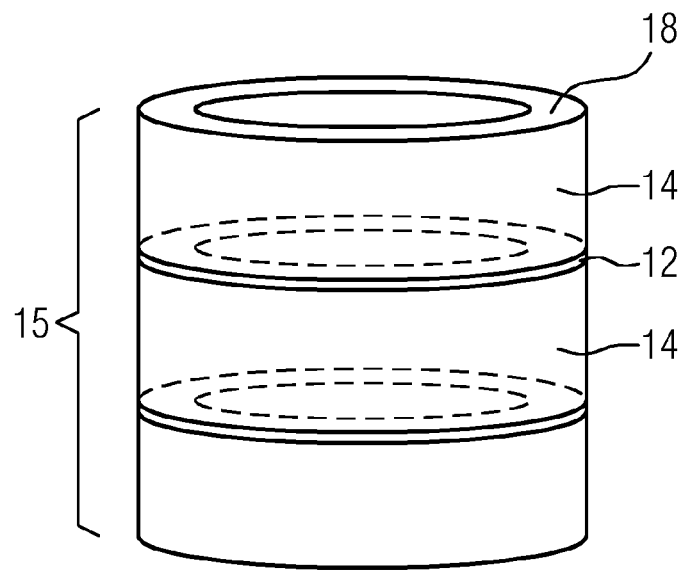
FIG. 2 shows a construction of green bodies for a structural element, said green bodies being stacked with preforms for an equipotential layer incorporating teachings of the present disclosure.

An illustration of a stacked body 15 is provided in FIG. 2, said stacked body 15 comprising the green body 14, which can also serve as a preform for the ceramic structural elements 6, as well as a base material 12 for equipotential layers 10. At least two green bodies 14 and one base material 12 herein are stacked on top of one another, wherein the green body 14 is already shaped in a correspondingly rotationally symmetrical manner in a separate process in this design embodiment. A slip casting method, or an axial or non-axial pressing method, respectively, is used herein, for example. The stack 15 illustrated in FIG. 2 is now fed to a heat treatment process.

In some embodiments, the heat treatment process can progress in multiple stages, wherein said heat treatment process is adapted so as to depend on the design embodiment and the physical/chemical behavior of the individual base materials 12, or of a ceramic base material 18 for the green body 14, respectively. In the case of a heat treatment process a sintering procedure is performed such that the base material 18 of the ceramic is compressed according to the described mechanism of sintering. A comparable process which is based on the same physical phenomena takes place simultaneously, wherein a compression by diffusion processes and/or fusing processes is also optionally performed herein, said compression in this case being referred to as sintering. The base material 12 after this process has been transformed to the final equipotential layer 10 which then forms a vacuum-tight layer that in electrical terms is at least in part conductive between the now completed structural elements 6.

In some embodiments, the base material 18 for the green body 14 of the structural element 6 and subsequently the base material 12 for the equipotential layer 10 are alternatingly filled into a shape-imparting tool for an overall composite green body 20. This filling can be performed by slip casting or by bulk powder supplies. A compression is subsequently performed, said compression being illustrated by way of example by the compression of a press mold 16 by way of a corresponding press ram (not illustrated) which for the sake of clarity is not illustrated. It is to be mentioned herein that a sleeve 17 is disposed in the center of the press mold 16 for a cavity to be generated, or for an annular or cylindrical, respectively, ceramic insulator to be represented, respectively. The alternating filling of the different base materials 12 and 18 is visualized by the arrows 32 and 32'.

Figure 3:
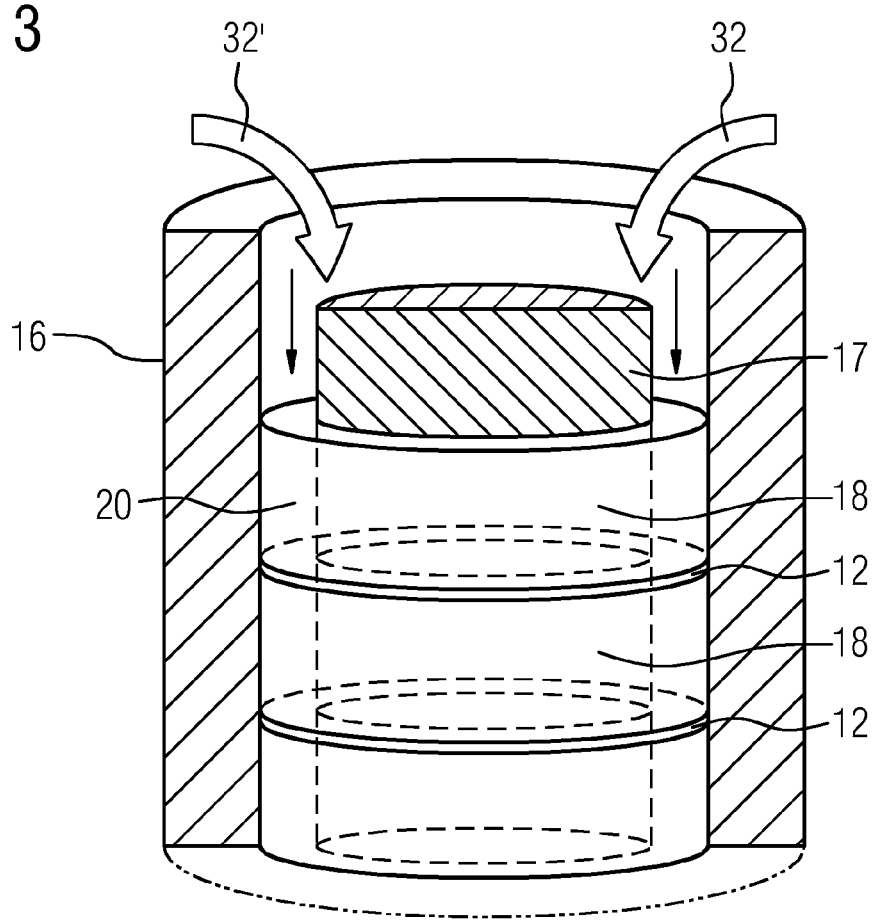
FIG. 3 shows a shape-imparting tool having a multi-layered green body being created therein incorporating teachings of the present disclosure.

A multi-layered green body 20 thus produced is subjected to a heat treatment process which is analogous to that already described in the context of the construction in FIG. 2. Sintering, or the forming of sintering necks, respectively, between the individual particles within the structural element 6, or within the equipotential layer 10, respectively, and in a joining region between the structural element 6 and the equipotential layer 10 likewise arises herein. A monolithic connection between the structural element 6 and the equipotential layer 10 is thus formed here in the green body 20 as per FIG. 3 as well as in the body according to FIG. 2.

Figure 4:
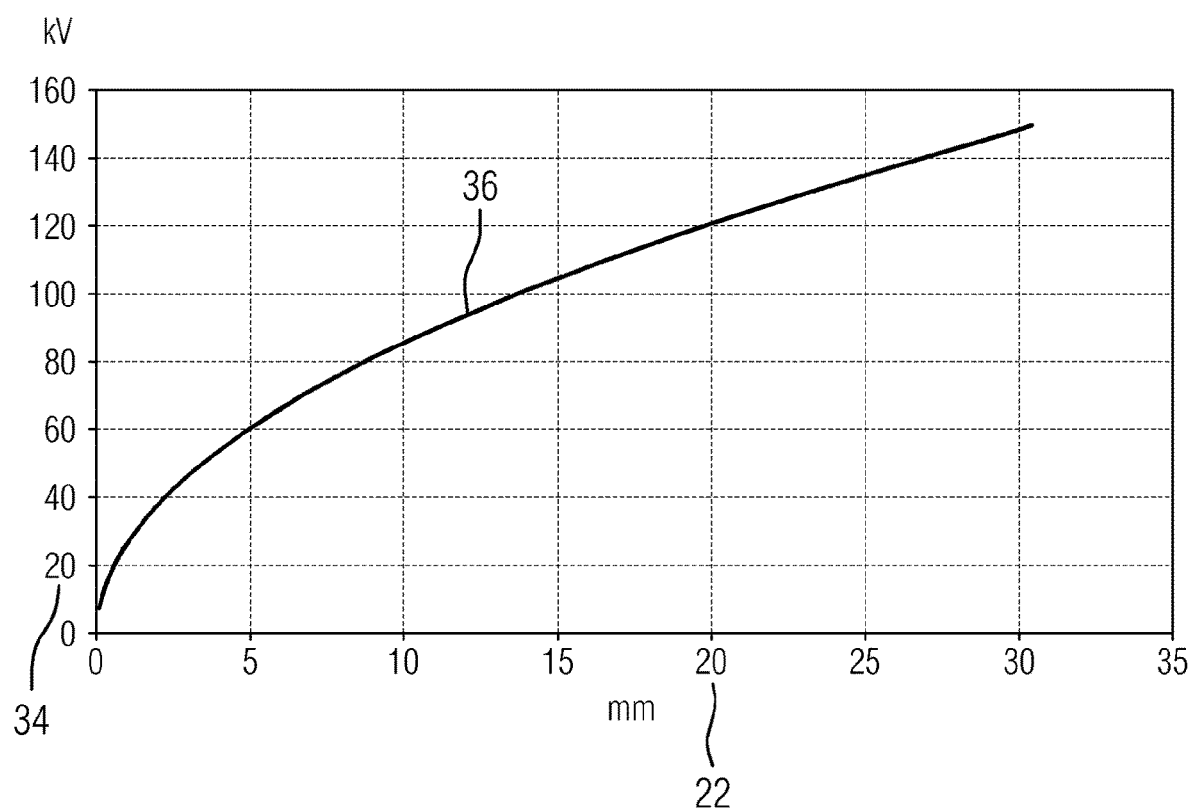
FIG. 4 shows the parabolic correlation between a breakdown field strength of ceramic insulators and the length of the latter.

An illustration of the dependence of a breakdown voltage 34 depending on the length or the height 22, respectively, of a structural element 6 is provided in FIG. 4. The curve per se, which represents a square-root-shaped dependence of the variables mentioned, is provided with the reference sign 36. It becomes visible by virtue of the square-root-shaped profile of the curve 36 that no significant increase in the breakdown voltage 34 arises in the case of the length of the structural element 6 being increased. In the case that insulators for very high voltages, thus for voltages in the range of 450 kV, are to be illustrated, a plurality of individual structural elements are placed on top of one another and joined to one another in a vacuum-tight manner by a complex soldering method, in particular by braising. This application of fusible solder typically also requires expensive silver compounds which is why the soldering method in terms of technology is complex and expensive. In the prior art, three 80 mm high structural elements are usually joined to one another herein in a complex manner corresponding to the soldering method. The entire ceramic insulator according to the prior art will have a length of 240 mm.

The described arrangement in terms of method technology is significantly more cost effective in relation to the soldering method since the joining method and the sintering method of the structural element take place in situ in one method step, or at least in part in one method step, respectively. The complexity in terms of the process in the production is significantly simplified on account thereof. It has been demonstrated in this way that a height of the structural element 6, or of the green body 14 thereof, respectively, which is between 15 mm and 35 mm, preferably between 20 mm and 30 mm, in the case of the same required proof voltage of 450 kV only requires four structural elements. This is joined by three interconnected joints and herein has three equipotential layers 10. By increasing the number of the equipotential layers 10 by one further equipotential layer in this way, the overall length of the insulator can be shortened to 80 mm, thus to approx. one third of the insulator that is known from the prior art. On the other hand, there is a further equipotential layer which by the method described can however be produced in a significantly more cost-effective manner than the solder method used in the prior art.

What is claimed is:

1. A method for producing a ceramic insulator for a high-voltage or medium-voltage switching system, the method comprising:
    placing axially symmetrical green ceramic structural elements 14/18 end-to-end along a shared longitudinal axis into a press mold 16;
    disposing a base material 12 for an equipotential layer 10 between each respective set of two axially symmetrical green ceramic structural elements 14/18 by filling a ceramic base material and equipotential layers in an alternating manner into a press mold;
    pressing the green ceramic structural elements 14/18 and the base material for the equipotential layers 10 together to form a multi-layered green body; and
    sintering the multi-layered green body to create a monolithic ceramic insulator;
    wherein each equipotential layer between a respective set of two axially symmetrical ceramic structural elements electrically subdivides the two axially symmetrical ceramic structural elements.

2. The method as claimed in claim 1, wherein the base material for the equipotential layer comprises at least one of the materials chosen from the group consisting of: a metal foil, a metal powder, a metallic woven fabric, a conductive ceramic, and an electrically conductive glass-forming material.

3. The method as claimed in claim 1, further comprising incorporating the base material for the equipotential layer between two green bodies of the ceramic structural elements.

4. The method as claimed in claim 3, wherein incorporating the base material for the equipotential layer includes a process selected from the group consisting of: dip coating, a thermal spray coat, chemical or physical deposition method, and applying a foil.

5. The method as claimed in claim 1, wherein incorporating the base material for the equipotential layer includes filling into a press mold.

6. The method as claimed in claim 1, wherein a height of the two ceramic structural elements along the symmetry axis is between 5 mm and 50 mm.

7. A method for producing a ceramic insulator for a high-voltage or medium-voltage switching system, the method comprising:
    placing axially symmetrical green ceramic structural elements end-to-end along a shared longitudinal axis into a press mold;
    disposing a base material for an equipotential layer between each respective set of two axially symmetrical green ceramic structural elements by filling a ceramic base material and equipotential layers in an alternating manner into a press mold, wherein the base material for the equipotential layer comprises a metal powder;
    pressing the green ceramic structural elements and the base material for the equipotential layers together to form a multi-layered green body; and
    sintering the multi-layered green body to create a monolithic ceramic insulator;
    wherein each equipotential layer between a respective set of two axially symmetrical ceramic structural elements electrically subdivides the two axially symmetrical ceramic structural elements.

* * * * *